US006356968B1

(12) United States Patent
Kishon

(10) Patent No.: US 6,356,968 B1
(45) Date of Patent: *Mar. 12, 2002

(54) APPARATUS AND METHOD FOR TRANSPARENT USB-TO-1394 BRIDGING AND VIDEO DELIVERY BETWEEN A HOST COMPUTER SYSTEM AND A REMOTE PERIPHERAL DEVICE

(75) Inventor: Jakob Kishon, Pleasanton, CA (US)

(73) Assignee: Cirrus Logic, INC, Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,414

(22) Filed: Sep. 3, 1997

(51) Int. Cl.$^7$ .............................................. G06F 13/00
(52) U.S. Cl. ........................ 710/129; 710/62; 710/64; 710/65; 710/68; 710/72; 710/126; 710/127; 710/128
(58) Field of Search ................................ 395/280, 281, 395/284, 285, 286, 309, 200.83, 200.77; 710/126–129, 63, 62, 64, 65, 72; 709/253; 245/168

(56) References Cited

U.S. PATENT DOCUMENTS

| | | | | |
|---|---|---|---|---|
| 5,553,160 A | * | 9/1996 | Dawson ........................ 382/166 |
| 5,675,139 A | * | 10/1997 | Fama ........................... 235/472 |
| 5,696,912 A | * | 12/1997 | Bicevskis et al. ............ 710/128 |
| 5,781,028 A | * | 7/1998 | Decuir ........................... 326/30 |
| 5,787,259 A | * | 7/1998 | Haroun et al. ............... 709/253 |
| 5,808,660 A | * | 9/1998 | Sekine et al. .................... 384/8 |
| 5,815,678 A | * | 9/1998 | Hoffman et al. ............. 710/129 |
| 5,841,424 A | * | 11/1998 | Kikinis ......................... 345/168 |
| 5,875,313 A | * | 2/1999 | Sescila, III et al. .......... 710/129 |
| 5,916,287 A | * | 6/1999 | Arjomand et al. ............. 701/29 |
| 5,935,224 A | * | 8/1999 | Svancarek et al. ............ 710/63 |
| 5,983,301 A | * | 11/1999 | Baker et al. ................. 710/113 |
| 6,040,792 A | * | 3/2000 | Watson et al. ............... 341/100 |

* cited by examiner

*Primary Examiner*—Zarni Maung
*Assistant Examiner*—Nabil El-Hady
(74) *Attorney, Agent, or Firm*—Steven A. Shaw; Steven Lin; Robert P. Bell

(57) ABSTRACT

The present invention provides an apparatus and method for transmitting serial data bits in a computer system having both an IEEE 1394 bus and a universal serial bus. The arrangement comprises a networked entertainment system comprising a host computer system and a remote peripheral consumer electronics device. The host system includes a processor, a bus, a memory, and a graphics card. A host interface circuit is coupled to the host system to provide an interface with a remote peripheral device. A remote interface circuit is coupled to the remote peripheral device to provide an interface with the host system. The host interface circuit and the remote interface circuit are connected to each other by an IEEE 1394 bus cable. The host interface circuit provides a USB port for connecting a USB device to the host system. The remote interface circuit provides USB ports for connecting USB devices. Both the host interface circuit and the remote interface circuit provide bridging functions whereby serial data bits are transmitted between the universal serial bus and the 1394 bus.

14 Claims, 9 Drawing Sheets

APPARATUS AND METHOD FOR TRANSPARENT USB-TO-1394 BRIDGING AND VIDEO DELIVERY BETWEEN A HOST COMPUTER SYSTEM AND A REMOTE PERIPHERAL DEVICE

FIELD OF THE INVENTION

The present invention relates to the field of serial bus interfaces, and more particularly to connecting peripherals to a host computer system through serial buses.

BACKGROUND ART

In today's homes, the personal computer (PC) and consumer electronics are beginning to merge into an "entertainment PC." The entertainment PC is projected to connect consumer electronic products such as DBS (Direct Broadcast Satellite), HDTV (High-definition Television), and DVD (Digital Versatile Disk), among others, to a PC. However, the conventional PC faces several problems in accommodating both the PC peripherals and consumer electronics products due to its configuration and expandability limitations.

Basically, a conventional PC is configured as a box containing major system components such as the processor, system bus, RAM (Random Access Memory), storage unit such as a hard disk drive, and graphics card, etc. A user generally interacts with the PC through input/output (I/O) devices such as a monitor, a keyboard, and a mouse, which are connected to the box through various cables. Hence for the most part, the user sees and interacts with the I/O devices of a PC.

However, the industry is presently moving toward a reduced and sealed PC box configuration, which can be stored in an inconspicuous place in the home. The sealed PC box contains components that users do not come m direct contact with, such as a processor, system bus, storage units, and graphics cards. The parts or components that a user physically interacts with such as I/O devices are assembled as a work- or play-station in convenient places such as a living room or a home-office. These components include I/O devices such as display monitors, keyboard, and mouse. These devices are connected to a remote box containing, for example, a floppy drive or a DVD player, to enable direct access for users. The remote box provides connection to the sealed PC box through one or more cables and may be placed under a display monitor.

The implementation of such an evolutionary entertainment PC in the home is limited in the way a conventional PC is attached to various external devices through a myriad of cables. For example, a typical PC may be connected to devices such as a monitor, keyboard, mouse, printer, modem, microphone, speakers, videocam, CD-ROM (Compact Disk-Read Only Memory), and DVD, etc. All these devices usually require separate cables. Indeed, connecting such devices to a PC over any appreciable distance is a formidable, complicated and messy task.

Another major limitation involves the allocation of interrupts in adding a peripheral device to the PC. Specifically, adding a component or device to a conventional PC box can be a difficult process due to the finite number of interrupts available. Moreover, because an ISA (Industry Standard Architecture) bus does not reliably share interrupts between various devices, the interrupt or IRQ conflicts are very common for devices that attach to the ISA bus. Accordingly, the conventional PC does not provide an easy and technologically sound framework upon which to build an entertainment PC.

To overcome the limitations of conventional PCs, two standards have been proposed and adopted by the industry to a large degree. First, an IEEE 1394 serial bus, commonly referred to as "FireWire," was proposed and adopted as an industry standard to replace various cables connecting myriad of components or peripherals to the PC box. A key advantage of this bus is its ability to connect both consumer electronics equipment and PC components. The 1394 cable carries both data and power: it contains two twisted pairs of wires for carrying data signals and two additional wires for power. Further, it can connect two components up to about 10 meters apart without a repeat assignment. Moreover, it allows daisy chain connection of components. The 1394 wire comes in two versions, a and b, and starts at 400 Mb/s (megabits per second) to 1 to 1.6 Gb/s (gigabits per second). Due to its high transmission rate, the IEEE 1394 bus is projected to be the standard cable to connect high speed drives that are connected by parallel cables such as IDEs and SCSIs (Small Computer System Interface).

Second, a Universal Serial Bus (USB) was adopted as an industry standard to replace I/O connections to conventional PCs. The USB eliminates IRQ conflicts and allows up to 127 devices to be attached to a PC. USB allows data transmission rate of 1.5 to 25 Mb/s and targets devices such as keyboard, mouse, etc. which typically require low bandwidth. Intel, the originator of USB, is rapidly incorporating a USB interface into its system logic chip sets and is including two USB connectors on its motherboards.

The adoption of the IEEE 1394 bus and USB provides an added momentum to the implementation of entertainment PC. However, in order to maximize the benefits of these buses, the conventional PC is projected to be modified to facilitate the connections between consumer electronics products and PC components. The reconfiguration of a PC involves repartitioning the PC system by making the PC look and feel more like a consumer electronics product to a user. This reconfiguration of a PC is based, in part, on an industry initiative concept called "device bay," which is essentially a way of connecting components or peripherals to a sealed PC. A device bay is classified according to the location of a peripheral. A local device bay refers to plugging a peripheral into a slot in the sealed box. On the other hand, a remote device bay refers to connecting a peripheral device at a physically different location through cables.

Unfortunately, a remote device bay requires both IEEE 1394 and USB cables to connect a remote peripheral device to an entertainment PC. This is because a USB cable can not connect consumer electronics products to a PC. It can only connect PC peripherals. On the other hand, the IEEE 1394 cable connects the entertainment PC to consumer electronics products.

Furthermore, one of the main benefits of an entertainment PC is its capacity to deliver digital videos to the living room. High quality consumer electronic products such as DBS, HDTV (High-definition television), and DVD, are making digital video a reality. Transmission of high resolution digital video data streams, however, presents a problem on a large display screen even on an IEEE 1394 bus. For example, to display digital video data at 16 bit YUV with a resolution of 1920×1080 at 30 frames per second requires 995 Mb/s (megabits per second) which exceeds the lower end bandwidth of 400 Mb/s supported by the IEEE 1394 bus. However, IEEE 1394 bus may be able to handle such video display at the higher bandwidth (1 to 1.6 Gb/s) it supports.

Thus, what is needed is an apparatus and method for transparently bridging USB over IEEE 1394 bus so that only one cable is needed to connect components of the entertainment PC located in different parts of a home. In addition, what is further needed is an apparatus for transparently delivering video data streams over IEEE 1394 bus.

SUMMARY OF THE INVENTION

The present invention provides a transparent USB-to-1394 bridge function whereby USB data packets are reformatted for transmission over an IEEE 1394 bus. The present invention also provides delivery of video data streams transparently from the host graphics card to a peripheral device over the IEEE 1394 bus.

In the present invention, a host computer system is coupled to a remote peripheral device through a single IEEE 1394 bus. The host system includes a processor, a bus, a memory, a graphics card, and a host interface circuit for interfacing the host system with the remote peripheral device. A remote interface circuit residing within the remote peripheral device provides an interface with the host system. The host interface circuit and the remote interface circuit are connected to each other by the single 1394 bus cable. Both the host interface circuit and the remote interface circuit provide USB-to-1394 bridging functions. Hence, USB devices as well as IEEE 1394 devices coupled to either the host system or the remote peripheral device can communicate over the single 1394 cable, thereby eliminating the need for any additional interconnect cables extending between the host and peripheral device.

In another embodiment, the present invention provides a graphics interface circuit in the host interface circuit. The graphics interface circuit provides an interface to a graphics controller in the host system for receiving and transmitting video data streams over 1394 bus to remote peripherals. The present invention also provides a compression engine in the graphics interface circuit to compress video data streams for delivery in the computer system over the IEEE 1394 bus.

BRIEF DESCRIPTION OF THE DRAWINGS

The accompanying drawings, which are incorporated in and form a part of this specification, illustrates embodiments of the invention and, together with the description, serve to explain the principles of the invention.

DESCRIPTION OF THE PREFERRED EMBODIMENTS

In the following detailed description of the present invention, an apparatus and method for a transparent USB-to-1394 bridge and digital video delivery, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

According to the embodiments of the present invention, a computer system comprises a host system and a remote peripheral device coupled through an IEEE 1394 bus cable. Additional peripheral devices can be added to the computer system through either a 1394 cable or a USB cable. Consumer electronics devices and computer peripheral devices requiring high throughput of over 12.5 Mb/s are preferably connected by a 1394 cable (e.g., HDTV) while other computer peripheral devices where speed is not critical are connected by a USB cable (e.g., keyboard and mouse). The present invention provides an arrangement whereby a host system is connected to remote peripheral devices through a single type of serial bus, 1394 cable, while allowing connection of USB devices to the remote peripheral devices. In addition, the present invention provides an arrangement for delivering digital video data streams transparently to and from remote peripheral devices.

Figure 1:
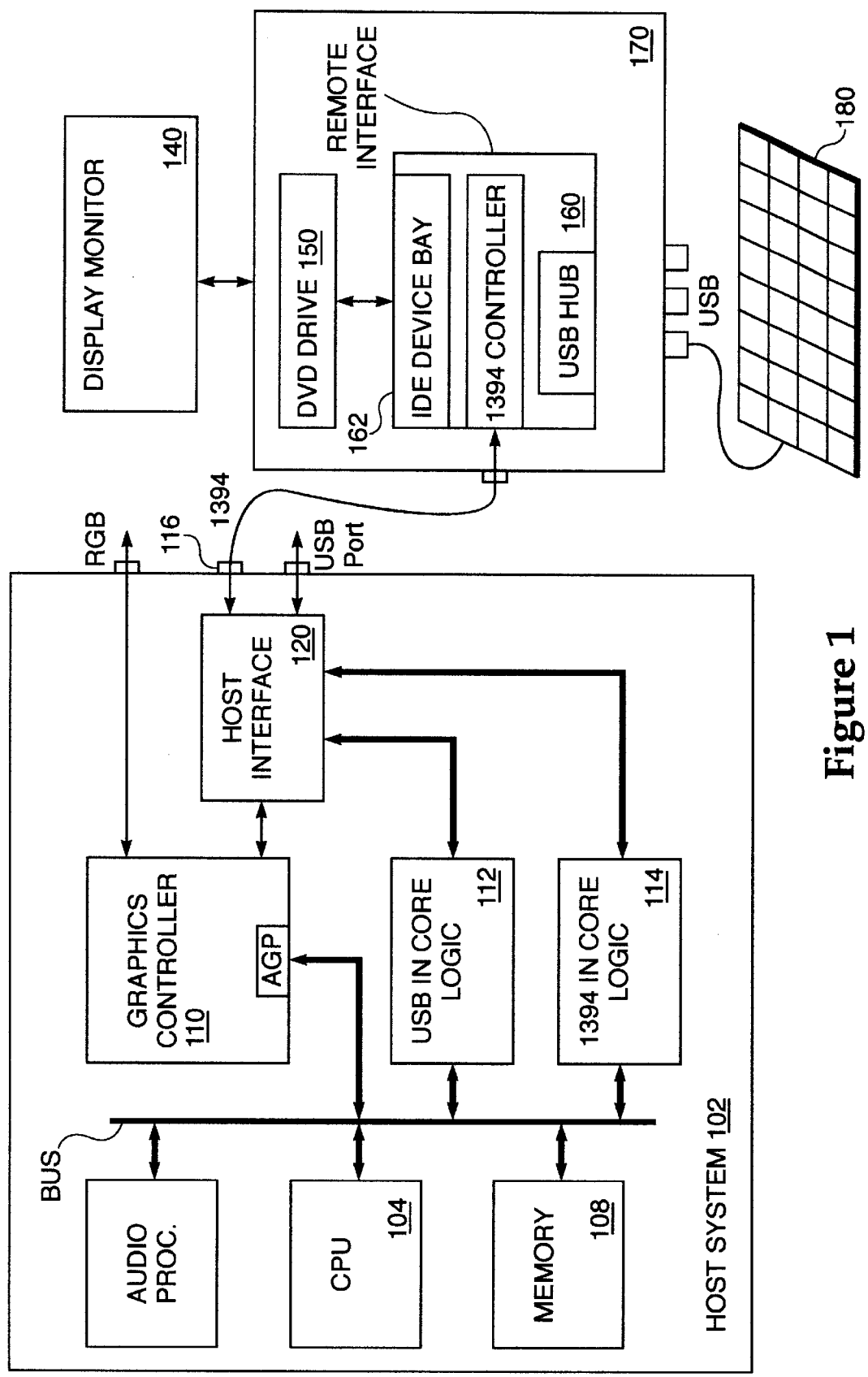
FIG. 1 illustrates an exemplary computer system comprised of a host system, a remote DVD drive, and a remote display monitor.

FIG. 1 illustrates an exemplary computer system 100 comprised of a host system 102 and remote peripheral devices 140 and 150 according to an embodiment of the present invention. The remote peripheral devices are exemplified by a DVD drive 150 and a display monitor 140. The host system 102 is preferably encased in a sealed box and includes a host processor 104, a memory 108, a graphics/video controller 110, a USB in core logic 112, a 1394 in core logic 114, and a system bus 106. Each component of the host system 102 is coupled to the system bus 106. In addition, a host interface 120 is coupled to the system bus 106, the graphics/video controller 110, the USB in core logic 112, the 1394 in core logic 114, and a 1394 port 116. According to a preferred embodiment of the invention, the host interface 120 is disposed within the host system 102. Although the computer system of the present embodiment is illustrated with a display monitor and a DVD driver, those skilled in the art will appreciate that it can accommodate up to 64 IEEE 1394 peripheral devices.

The host interface 120 in the host system 102 connects to a remote interface 160 through a 1394 bus cable. The host interface 120 and the remote interface 160 together provide the interface to enable the host system 102 and the remote devices 140 and 150 to communicate through the 1394 bus. In the present embodiment, the DVD drive 150 is coupled to the remote interface 160 through an IDE device bay 162. The remote interface 160 and the DVD drive 150 are preferably encased in a remote box 170. In addition to the DVD drive 150, the remote interface 160 is coupled to a display monitor 140 and a keyboard 180. The display monitor 140 is preferably connected by a VGA (Video Graphics Array) cable, and the keyboard 180 is connected by a USB cable to the USB hub. Besides these peripheral devices, the remote interface of the present invention can be used to provide interface between a host system and other remote peripheral devices such as a display monitor, DVD drive, DBS, and HDTV, among others.

Figure 2:
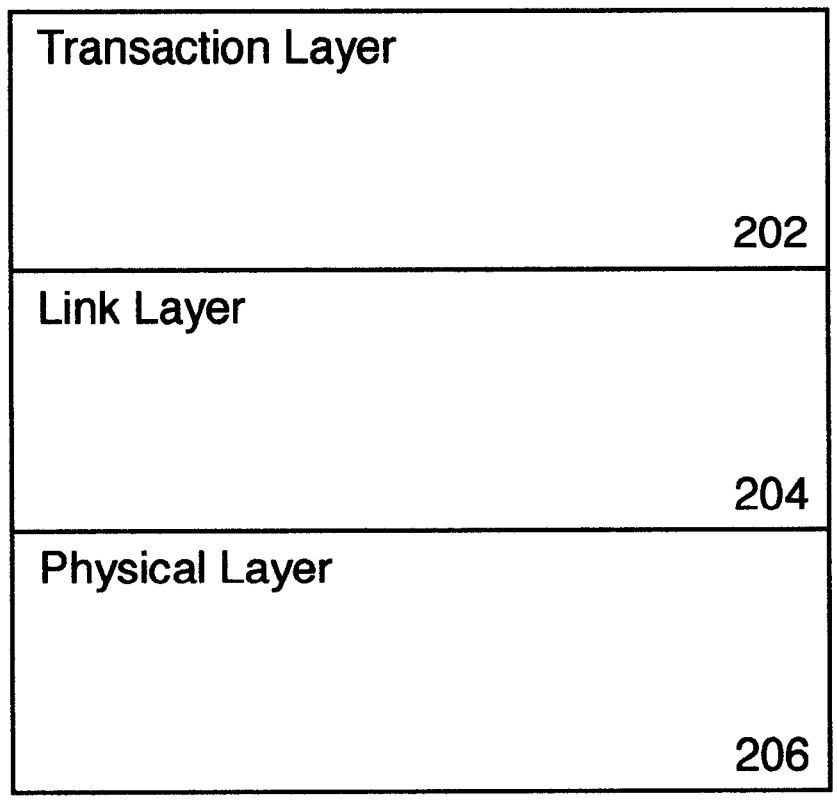
FIG. 2 illustrates the three-layer modeling of IEEE 1394 bus interface.

According to the embodiments of the present invention, a peripheral device and a host system are connected through a 1394 cable. The IEEE 1394 is implemented in three layers as shown in FIG. 2. In this configuration, a layer below services the layer directly on top. The physical layer (PHY) 206 at the bottom provides the electrical and mechanical connections between a 1394 cable and 1394 device. The physical layer 206 receives a data packet encapsulated in 1394 format and transmits it to either the link layer 204 or to a 1394 device through a 1394 cable. In addition, the physical layer 206 provides arbitration to ensure fair access for the attached 1394 devices. The layer on top of the physical layer 206 is the link layer 204. The link layer 204 transmits and/or receives data packets for asynchronous and isochronous data transmission. The transaction layer 202, on top of the link layer 204, issues asynchronous write, read, and lock commands.

With reference to FIG. 1, a transaction layer in the present embodiment is illustrated by USB Core Logic 112 and 1394 Core Logic 114. The USB Core Logic 112 and 1394 Core Logic 114 are both coupled to the host interface 120 on one side and to the host system bus on the other. Since USB and 1394 devices are not mapped into memory and I/O address space directly, the transaction layer uses the USB Core Logic 112 and 1394 Core Logic 114 to supply the programming interface drivers. For example, USB and 1394 drivers provide interface to client software drivers, manage configuration process, and schedule and monitor transactions. These USB and 1394 Core Logics 112 and 114 are presently being implemented into the motherboard designs by companies such as Intel Corporation.

A 1394 bus allows both asynchronous and isochronous data transmission. To transmit data, a 1394 device broadcasts a request on the 1394 bus to control the physical layer. In an asynchronous mode, the device sends a data packet preceded by the addresses of itself and a receiver. After the receiver accepts the packet, it returns a packet acknowledgment to the sending device. In an isochronous mode, the 1394 device broadcasts a request on an isochronous channel of a specific bandwidth. Then, the device sends the isochronous channel ID and a data packet to a receiver. The receiver monitors the channel and accepts the data packet. The 1394 bus allows up to 64 isochronous channels corresponding to the number of 1394 devices that may be attached to a 1394 bus.

Figure 3:
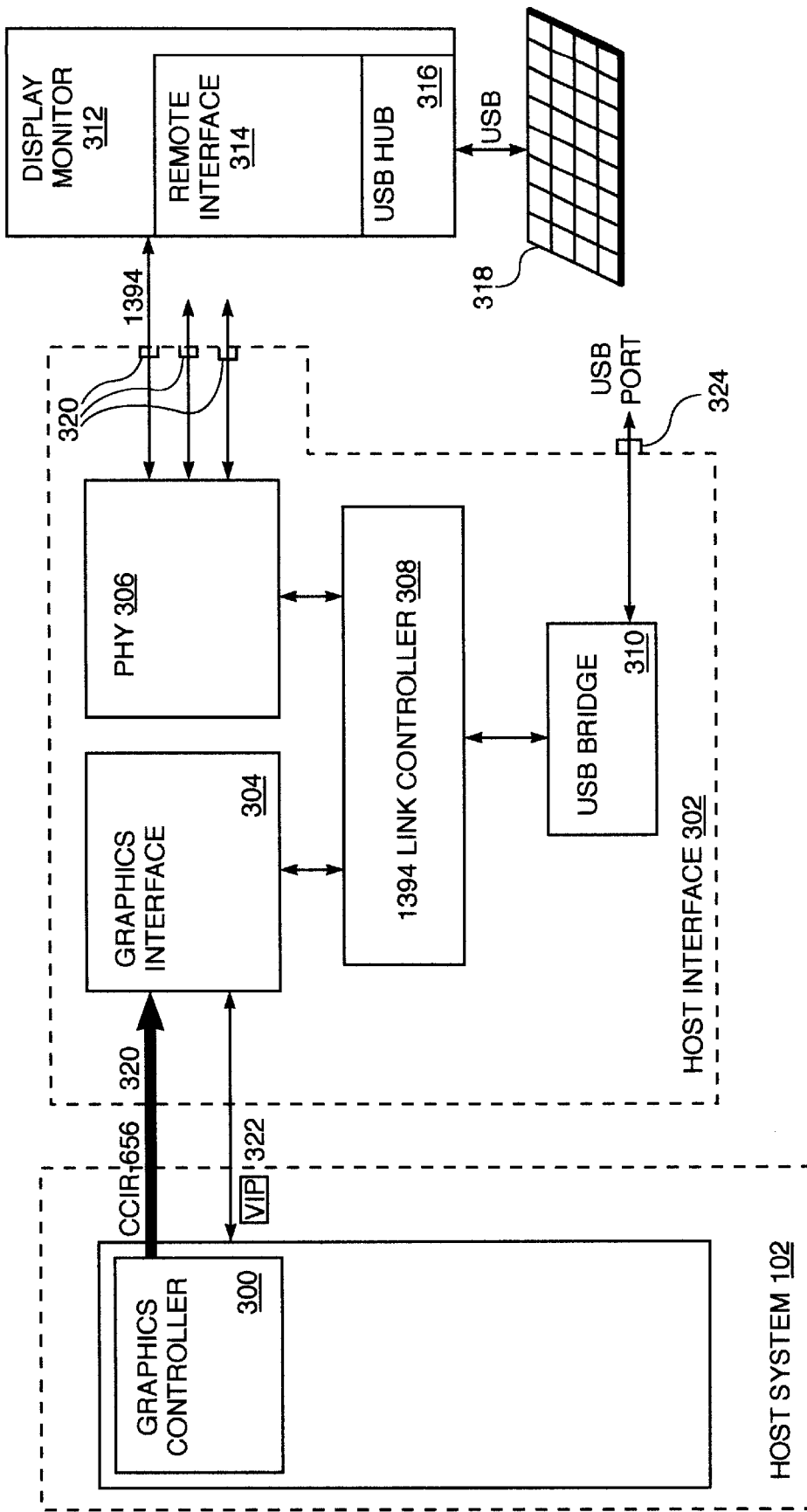
FIG. 3 illustrates a block diagram of a host interface and its connection to a host system and a remote device.

FIG. 3 shows a block diagram of a host interface 302 and its connection to a host system and a remote device. The host interface 302 provides the interface between a graphics/video controller 300 in the host system 102 and the remote interface 314 coupled to an exemplary remote device, a display monitor 312. The remote interface 314 is connected to a keyboard 318 through a USB hub 316. In the present embodiment, the host system 102 communicates with the keyboard 318 and the display monitor 312 through the host interface 302 and the remote interface 314. In an alternative embodiment, the host interface 302 may be disposed within the graphics/video controller 300 and coupled to the internal bus of the graphics/video controller 300 in the host system 102.

According to a preferred embodiment of the invention, the host interface 302 is comprised of a graphics interface 304, a 1394 link controller 308, a USB-to-1394 bridge 310, and a physical layer circuit ("PHY"). PHY 306, which is a physical layer providing three 1394 ports for connection to remote devices. The host interface 302 provides 1394 bus connections to remote peripheral devices through the PHY 306. The PHY 306 is coupled to three 1394 ports 320 which provide physical connections to 1394 bus cables. The PHY 306 is also coupled to the 1394 link controller 308 through an internal bus. Hence, all data communication between the host system 102 and a remote system takes place through the PHY 306. Physical layer chips for implementing PHY 306 are commercially available today from venders such as Texas Instruments, Inc. (e.g., TSB11CO1DL).

Figure 4:
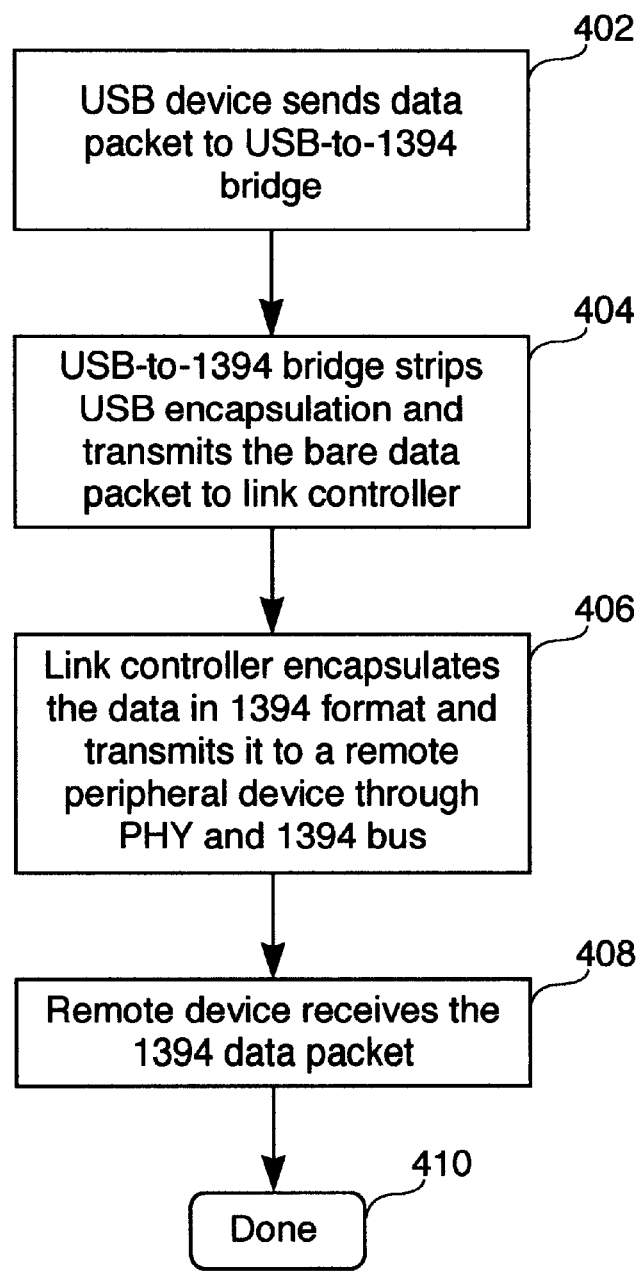
FIG. 4 illustrates a flow diagram of an exemplary process of bridging a serial data packet originating from a USB device to a remote peripheral device through an IEEE 1394 bus.

The USB-to-1394 bridge 310 is coupled to the 1394 link controller 308 and a USB port 324. The USB-to-1394 bridge 310 provides transparent bridging of data packets between USB and 1394 protocols. FIG. 4 illustrates a flow diagram of an exemplary process of bridging a serial data packet originating from a USB device to a remote peripheral device through an IEEE 1394 bus. In step 402, a USB device connected to the USB port transmits a packet encapsulated in USB format to the USB-to-1394 bridge 310. Then in step 404, the USB-to-1394 bridge 310 removes the USB encapsulation and transmits the stripped packet to the 1394 link controller 308. In step 406, the 1394 link controller 308 encapsulates the data in 1394 format and transmits it to a remote peripheral device through the PHY 306 and 1394 bus. The remote peripheral device receives the 1394 data packet for processing in step 408. The process then terminates at step 410.

Figure 5:
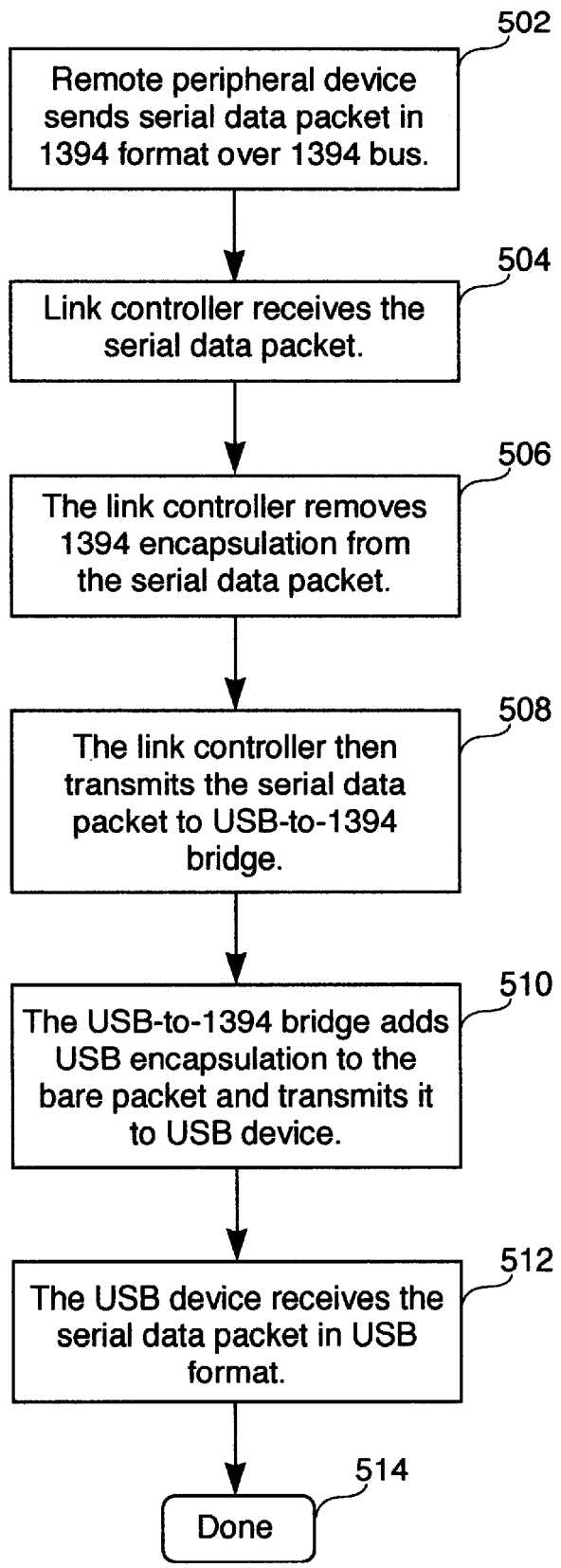
FIG. 5 illustrates a flow chart of an exemplary process of bridging a serial data packet originating from a remote peripheral device to a USB device through an IEEE 1394 bus.

Similarly, a serial data packet originating from a remote peripheral device through an IEEE 1394 bus is bridged to an USB device connected to the USB port 324. FIG. 5 illustrates a flow chart of an exemplary process of bridging a serial data packet originating from a remote peripheral device to a USB device through an IEEE 1394 bus. In step 502, the remote peripheral device sends a serial data packet in 1394 format over the 1394 bus. Then in step 504, the 1394 link controller 308 receives the serial data packet through the 1394 bus and PHY 306. The link controller 308, in step 506, strips the 1394 encapsulation from the serial data packet by removing the 1394 envelope. Then in step 508, the link controller 308 transmits the serial data packet to the USB-to-1394 bridge 310. In step 510, the USB-to-1394 bridge 310 adds USB encapsulation to the bare packet and transmits it to the USB device attached to the USB port 324. The USB device receives the serial data packet in USB format in step 512. The process then terminates in step 514.

The 1394 link controller 308 is coupled to the graphics interface 304, the PHY 306, and USB-to-1394 bridge 310. The graphics interface 304 in the host interface 302 provides the connection to the graphics/video controller 300 in the host system 102 to receive exemplary 8-bit digital graphics/video data streams such as CCIR-656 (MPEG) data streams 320, which are well known in the present and related art. According to the present embodiment of the invention, all data between a host system and a remote peripheral pass through the 1394 link controller. The 1394 link controller 308 transforms data streams into packets and transmits and/or receives 1394 formatted data packets to and from PHY 306. It also provides cycle control for isochronous channels. A link controller is also commercially available from Texas Instruments (e.g., TSB12C01APZ link layer chip).

Figure 6:
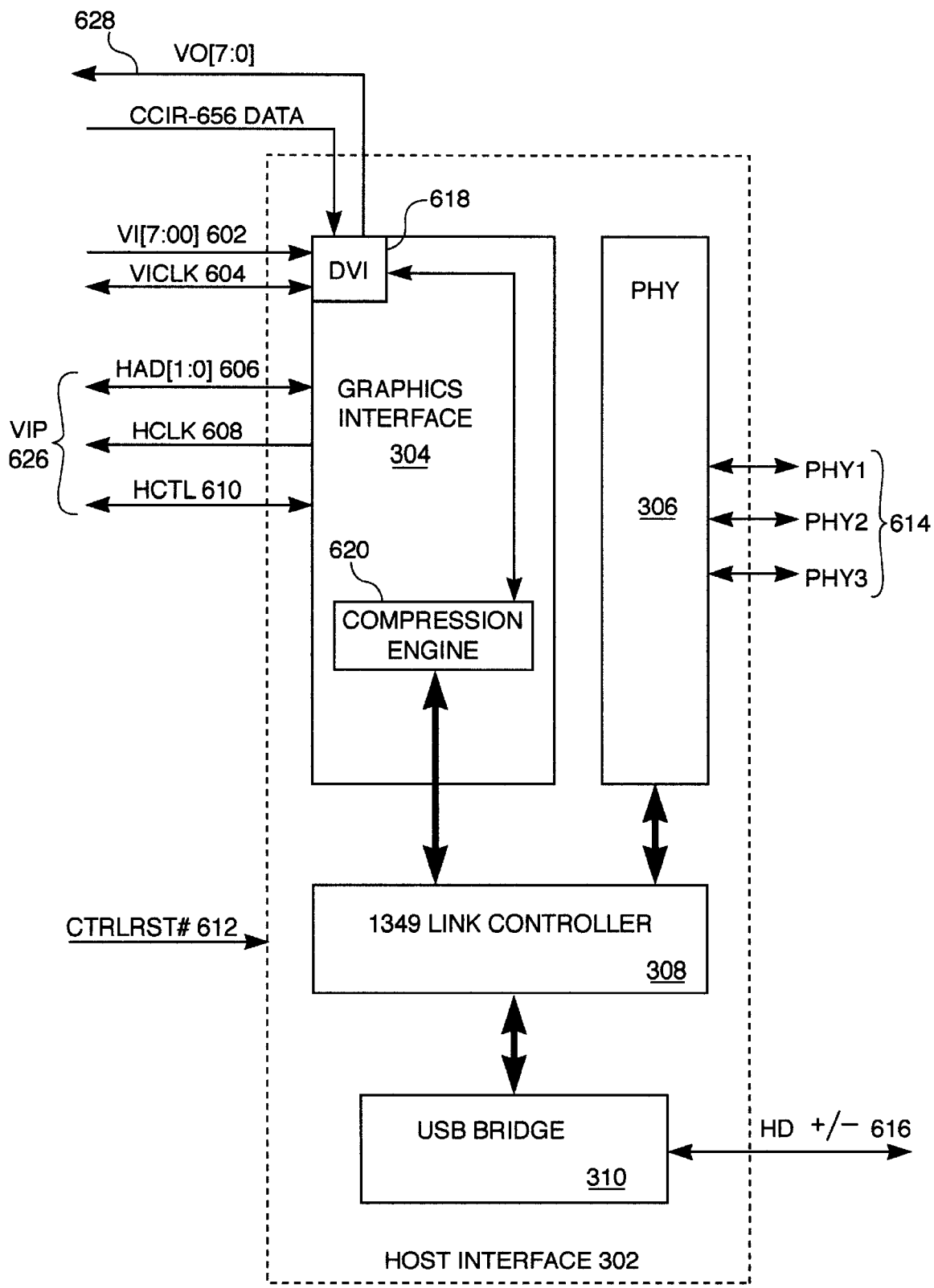
FIG. 6 illustrates a detailed block diagram of the host interface and its input/output lines.

FIG. 6 provides further details on the host interface and its input/output lines. The graphics interface 304 in the host interface 302 is further comprised of a digital video interface 618, a compression engine 620, and a VIP (Video Interface Port) 626. The VIP 626 provides set up and status information through HAD[1:0] (VIP host port address data) 606, HCLK (VIP host port clock) 608, and HCTL (VIP host port status/control) 610 to enable a graphics controller to communicate with the graphics interface 304 in sync. The digital video interface 618 is coupled to the graphics controller through a video input port, VI[7:0] 602, and receives exemplary 8-bit digital graphics/video data such as CCIR-656 data streams after synchronizing video input clock, VICLK 604.

The compression engine 620 is coupled to the digital video interface 618 and 1394 link controller 308 to receive digital video data from either side. It then compresses the digital video data, preferably at a 3 to 1 lossless ratio, and outputs the compressed data to the graphics controller through a video output port, VO[7:0] 628. The compression engine 620 may also transmit the compressed data to a remote device through the 1394 link controller 308 and PHY 306. During the interface between the graphics controller 300 and the graphics interface 304, the VIP host interface 626 provides setup and control signals to enable transfer of digital graphics/video data. In an alternative embodiment, the graphics interface does not provide a compression engine so that video data streams are transmitted without compression between a host system and a remote device.

Figure 7:
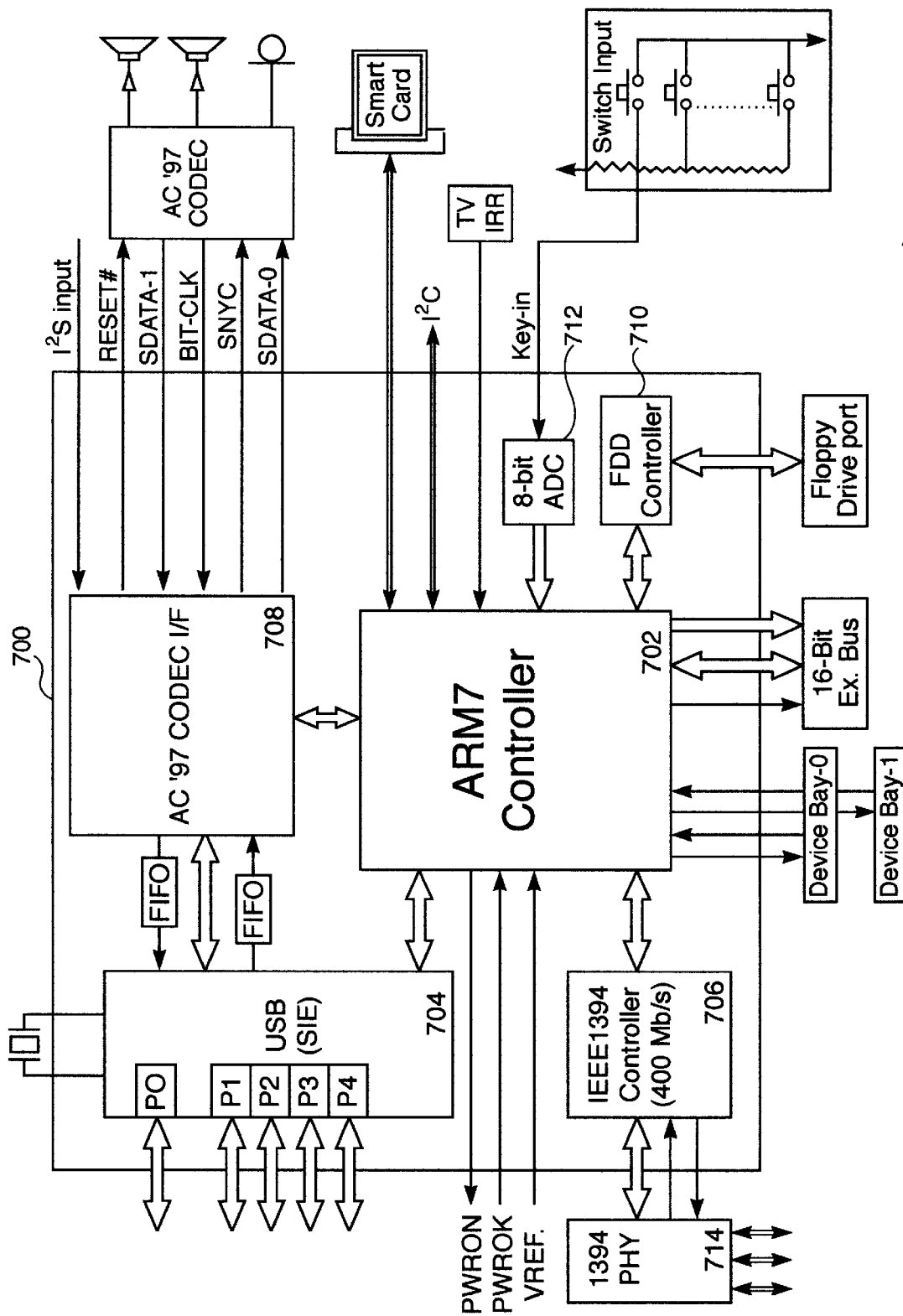
FIG. 7 illustrates a block diagram of an audio remote interface connecting a host interface and a remote peripheral device.

In the embodiments of the present invention, a host system is coupled to a remote peripheral device through a remote interface. FIG. 7 illustrates a detailed view of an exemplary audio remote interface 700. The audio remote interface 700 is coupled to the host interface for transmitting and receiving audio data streams of packets encapsulated in 1394 format. The audio remote interface 700 comprises a remote interface controller 702, a USB interface 704, a 1394 controller 706, an audio compression-decompression interface 708, a floppy controller 710, and an analog-to-digital converter 712.

The 1394 controller 706 in the audio remote interface 700 provides interface with the host interface through an external 1394 PHY 714, which is connected to a 1394 PHY on the host interface side through a 1394 bus cable. The external 1394 PHY 714 is preferably disposed in a remote box containing the audio remote interface 700. The 1394 controller 706 performs similar functions as the 1394 link controller in the host interface. That is, it transmits and receives 1394 encapsulated data packets to and from the host interface.

Within the audio remote interface 700, the 1394 controller 706 is coupled to a remote interface controller 702. In the present embodiment, the remote interface controller 502 is a RISC (Reduced Instruction Set Controller) processor such as ARM7 processors commercially available from Advanced RISC Machines located in California. Data packets from the host interface are transmitted through the 1394 controller 706 to the remote interface controller 702 to be processed. The remote interface controller provides a bridging function between the USB encapsulated data coming from the USB interface 704 and the 1394 encapsulated data entering from the 1394 controller 706.

The remote interface controller 702 provides connections for two device bays and IDE devices. A floppy disk controller is coupled to the remote interface controller 702 for interface and transmission of data. In addition, an 8-bit analog-to-digital converter is coupled to the remote interface controller 702 and to external device control and switches such as volume, power, and channel, among others.

The USB interface 704 consists of an upstream port with built-in transceivers and a hub of four downstream device ports. (Port-[1:4]) with built-in transceivers. The upstream port provides a direct USB connection to a USB port with higher hierarchy such as the lone USB port in the host interface. The downstream ports provide connection to non-video peripherals such as keyboard, mouse, and a joystick. According to the embodiments of the present invention, the USB interface supports both low and high speed communication, isochronous data transfer for audio I/O, asynchronous control and interrupt data transfers in accordance with USB specification Rev. 1.0.

The USB interface 704 is connected to an audio codec (compression-decompression) interface 708, which supports AC '97 Codec and AC3 Codec interfaces, among others. First-in-first-out (FIFO) buffers are provided between the USB interface 704 and the audio codec interface 708, one in each direction, to ensure reliable and accurate transmission of data streams between them. The audio codec interface provides interface to an external audio codec device coupled to a speaker.

The remote interface controller 702 is connected to the audio codec 708 to provide audio data stream to be outputted to an external codec device such as a speaker. According to the present embodiment, the audio remote interface 700 allows interface to an audio peripheral device from the host system and other peripherals through 1394 bus or through USB ports.

Figure 8:
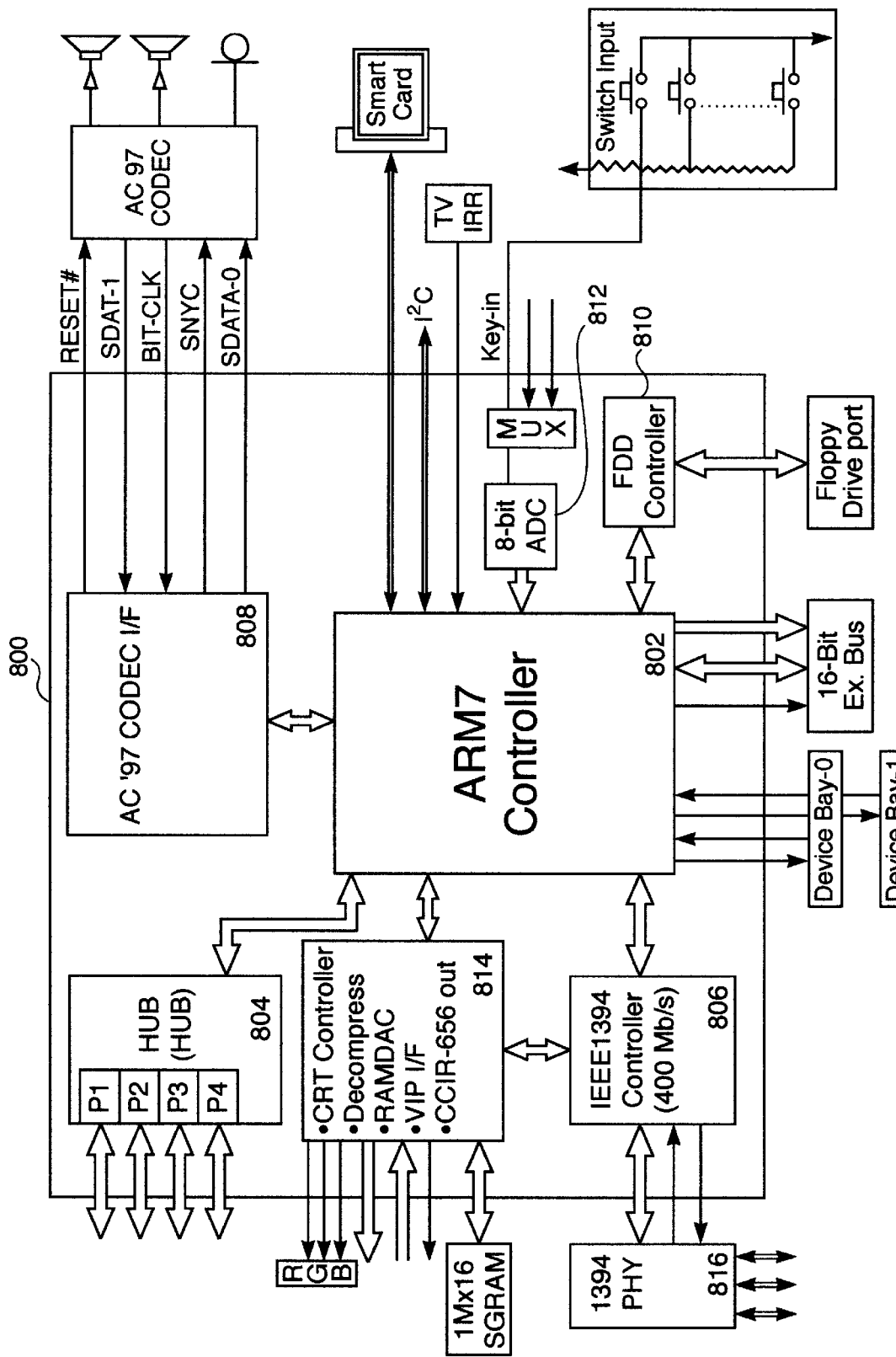
FIG. 8 illustrates a block diagram of a video remote interface connecting a host interface and a remote peripheral device.

FIG. 8 illustrates an exemplary video remote interface 800 for providing a full video interface between a remote video peripheral device and a host system according to the present embodiment, the video remote interface 800 comprises a remote interface controller 802, a USB hub 804, a video display interface 814, a 1394 controller 806, an audio codec (compression-decompression) interface 808, a floppy controller 810, and an 8-bit analog to digital converter 812. The video remote interface 800 functions in substantially similar manner to the audio remote interface except for two features. First, unlike the audio remote interface, the video remote interface 800 contains a video display interface 814 coupled to the remote interface controller 802 and 1394 controller 806. Second, in contrast to the USB interface in the audio remote interface, the video remote interface 800 contains only a USB hub 804. That is, it provides connections to downstream USB devices only. Moreover, the USB hub 804 is not directly connected to the audio codec interface 808. Hence all audio data passed through the remote interface controller 802.

The video display interface 814 provides connection to a display monitor and is further comprised of a CRT (Cathode Ray Tube) controller, a decompression engine, a RAMDAC (Random Access Memory Digital-to-Analog Converter), a VIP interface, and a digital video data output port (e.g., CCIR-656). The CRT controller is built-in and is programmable with DDC (Display Data Channel) support. The RAMDAC provides digital to analog conversion for output to analog output devices. The VIP port is provided with a digital video input such as CCIR-656. The digital video data output port is provided for outputting the video data to an external encoder. The decompression engine decompresses video data streams prior to outputting the data to a display device.

The 1394 controller 806 provides interface between the host interface and the video remote interface 800 through an external 1394 PHY 816, which is connected to a 1394 PHY on the host interface side through a 1394 bus cable. The external 1394 PHY 816 is preferably disposed in a remote box containing the video remote interface 800. The 1394 controller 806 transmits and receives 1394 encapsulated data packets to and from the host interface.

Within the video remote interface 800, the 1394 controller 806 is coupled to a remote interface controller 802. In the present embodiment, the remote interface controller 802 is a RISC processor such as ARM7 processors commercially available from Advanced RISC Machines located in California. Data packets from the host interface are transmitted through the 1394 controller 806 to the remote interface controller 802 to be processed. The remote interface controller bridges a universal serial bus encapsulated data to and from an 1394 bus encapsulated data.

The USB interface 804 is a USB hub of four downstream device ports (Port- [1:4]) with built-in transceivers. These downstream ports provide connection to non-video peripherals such as keyboard joystick, and an audio CD-ROM. According to the embodiments of the present invention, the USB interface supports both low and high speed communication, isochronous data transfer for audio I/O, asynchronous control and interrupt data transfers in accordance with USB specification Rev. 1.0.

The USB interface 804 is connected to the remote interface controller 802. An audio codec (compression-decompression) interface 808, which supports AC '97 Codec and AC3 Codec interfaces, among others, is connected to the remote interface controller 802. The audio codec interface provides interface to an external audio codec device coupled to a speaker. The remote interface controller 802 is connected to the audio codec 808 to provide audio data stream to be outputted to an external codec device such as a speaker. According to the present embodiment, the audio remote interface 800 allows interface to an audio peripheral device from the host system and other peripherals through 1394 bus or through USB ports.

Figure 9:
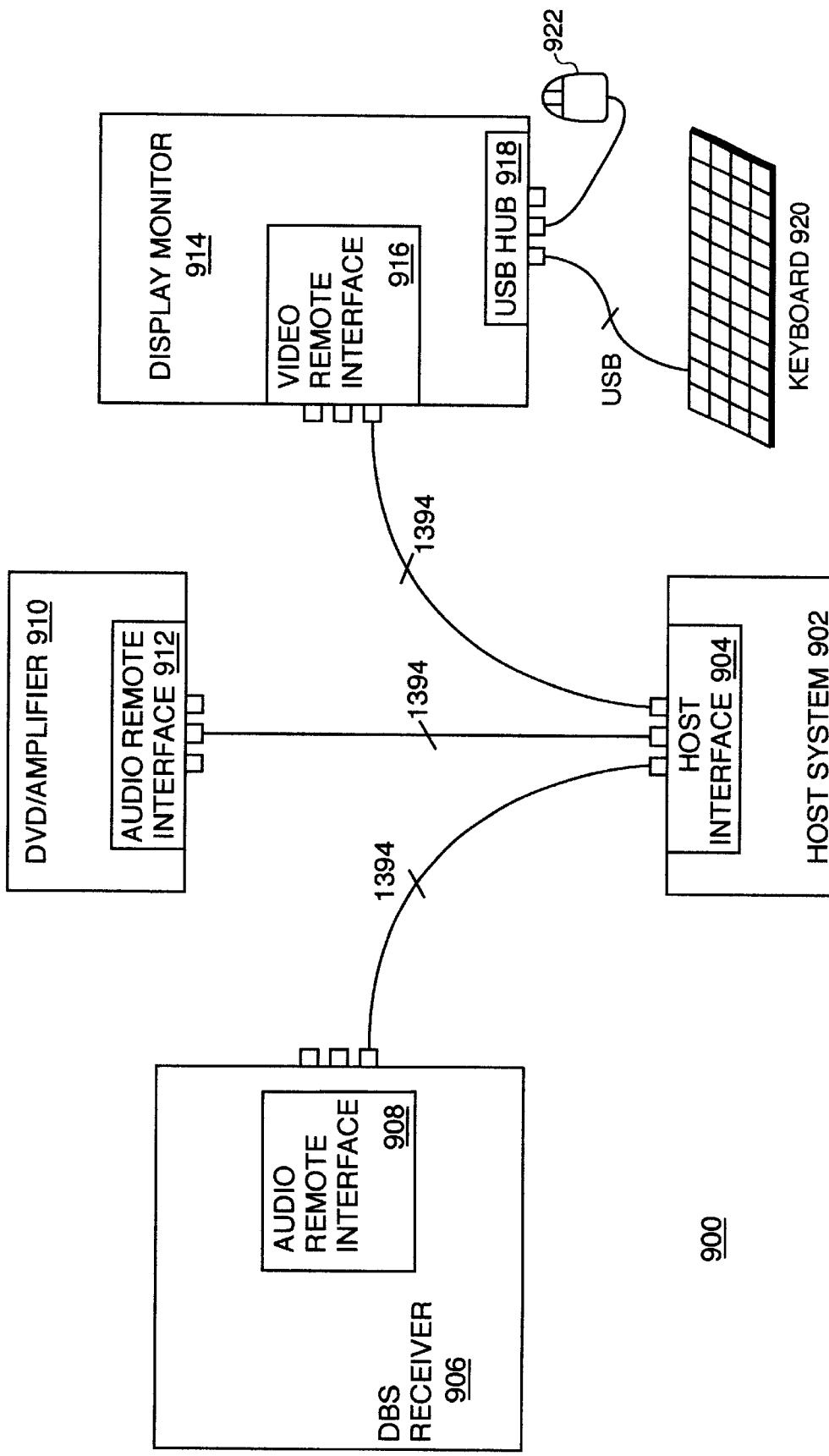
FIG. 9 illustrates an overview of an exemplary host system coupled to remote audio and video peripheral devices.

FIG. 9 illustrates an exemplary computer system 900 comprised of a host system 902 connected to audio and video remote devices according to the embodiments of the present invention. The host system 902 is coupled to a host interface 904. A video remote interface 916 connects a display monitor 914 to the host interface 904 through a 1394 cable. A DVD drive and an amplifier combination 910 is connected to a first audio remote interface 912 through a device bay (not shown). A DBS receiver 906 is coupled to a second audio remote interface 908. The host system 902 in the present embodiment is thus connected to one video remote interface and two audio interfaces.

The video remote interface 916 provides connections to a keyboard 920 and a mouse 922, which are coupled to the USB hub 918. The exemplary configuration allows a user at the keyboard to control all devices connected to the host system through the host and remote interfaces. For example, a digital satellite transmission comes in through the satellite receiver. The digital video data stream is encapsulated in 1394 format in the video remote interface 916 and is directed into the host system 902 through the host interface 904. The host system 902 processes the video stream and sends it to the display monitor through the host interface 904 and the video remote interface 916 connected to the display monitor 914. The video remote interface 916 receives the video data stream and transmits it to the display monitor 914 for display.

Similarly, a user may access and play the DVD drive and amplifier combination 910 from the keyboard 920. The command to play the DVD drive is originally encapsulated in USB format. The video remote interface 916 receives the command and encapsulates it in 1394 format. Then the command, now encapsulated in 1394 format, is relayed to the host system 904 which transmits it to the first audio remote interface 912. The first audio remote interface 912 then relays the command to the remote interface controller in the audio remote interface 912, which transmits the command to the DVD drive and amplifier combination. In response, the DVD drive and amplifier combination plays a DVD disk.

The preferred embodiments of the present invention, an apparatus and method for a transparent USB-to-1394 bridging and video delivery, is thus described. While the present invention has been described in particular embodiments, the present invention should not be construed as limited by such embodiments, but rather construed according to the below claims.

What is claimed is:

1. An electronic device comprising:
   an interface for coupling the electronic device to a host computer via an IEEE 1394 communication link, said interface comprising:
   an USE port,
   an IEEE 1394 port, and
   a remote interface controller permitting a USE-compliant peripheral device to be coupled to said interface,
      wherein said remote interface controller receives USE formatted data and reformats the USE formatted data in an IEEE 1394 format and said interface communicates IEEE 1394 reformatted data to a host computer via the IEEE 1394 port.

2. The electronic device of claim 1, wherein said remote interface controller receives USB formatted data, removes USB encapsulation from the USB formatted data to provide a stripped packet of data,
   wherein the remote interface controller further comprises a link controller for receiving the stripped packet of data and encapsulating the stripped packet in 1394 format to produce IEEE 1394 reformatted data,
   wherein said remote interface controller communicates the IEEE 1394 reformatted data to a host computer via the IEEE 1394 port.

3. A networked entertainment system comprising:
   a host computer comprising:
      a CPU,
      a bus coupled to said CPU,
      a memory coupled to said bus, and
      a host interface coupled to said CPU, said host interface having an IEEE 1394 port; and
   an electronic device comprising:
      an interface for coupling the electronic device to said host computer via an IEEE 1394 communication link, said interface comprising:
         a USB port,
         an IEEE 1394 port, and
         a remote interface controller permitting a USB-compliant peripheral device to be coupled to said USB port,
            wherein said remote interface controller receives USE formatted data and reformats the USB formatted data in an IEEE 1394 format and said interface communicates IEEE 1394 reformatted data to said host computer from the IEEE 1394 port of the remote interface controller to the IEEE 1394 port of the host computer.

4. The networked entertainment system of claim 3, wherein said host interface further comprises:

a graphics interface;

an IEEE 1394 physical layer device coupled to the IEEE port of the host computer; and an IEEE 1394 link controller coupled to said graphics interface and said IEEE 1394 physical later device, wherein said 1394 link controller transforms data streams from said host computer to said electronic device into IEEE 1394 formatted data packets and provides said data packets to said IEEE 1394 physical layer device for transmission through the IEEE 1394 port of the host computer.

5. The networked entertainment system according to claim 4, wherein said host computer further comprises a graphics controller, said host interface further comprises a graphics interface coupled to said IEEE 1394 link controller and said graphics controller, and said graphics interface receives graphics/video data streams from said graphics controller.

6. The networked entertainment system according to claim 5, wherein said graphics interface comprises:

a digital video interface receiving graphics/video data from said graphics controller;

a video interface port receiving set up information, control information, and status information from said graphics controller; and a compression engine coupled to said digital video interface and said IEEE 1394 link controller, said compression engine compressing said graphics/video data for transmission over said IEEE 1394 communications link.

7. The electronic device of claim 3, wherein said remote interface controller receives USB formatted data, removes USB encapsulation from the USE formatted data to provide a stripped packet of data, wherein the remote interface controller further comprises a link controller for receiving the stripped packet of data and encapsulating the stripped packet in 1394 format to produce IEEE 1394 reformatted data, wherein said remote interface controller communicates the IEEE 1394 reformatted data to a host computer via the IEEE 1394 port.

8. A method of controlling a host computer via a USB-compatible input device remotely coupled to said host computer by an IEEE 1394 communication link, said method comprising the steps of:

generating a USB data packet including data and USB specific transmission information using data from the USB-compatible input device, separating a data portion from the USB specific transmission information, encapsulating the data portion in an IEEE 1394 transmission format to form an IEEE 1394 encapsulated packet, and transmitting said IEEE 1394 encapsulated packet to said host computer through said IEEE 1394 communication link thereby allowing said host computer to be operated remotely from the USB-compatible input device.

9. A computer system comprising:

a host computer;

a USB-compatible device for generating commands for controlling said host computer; and a remote interface coupled to said USB compatible device via a USB interface and coupled to said host computer via an IEEE 1394 communication link, said remote interface including translation logic for converting commands received from the USB compatible device from USB to IEEE 1394 format.

10. The computer system of claim 9 further comprising:

an IEEE 1394-compatible device also coupled to said remote interface permitting said host computer to receive from or transmit to either of said USB-compatible or IEEE 1394-compatible devices.

11. The computer system of claim 9, wherein said host computer includes compression logic for compressing video or graphics data from said host computer.

12. The computer system of claim 11, wherein said host computer further comprises:

an IEEE 1394 physical layer device coupled to said compression logic, wherein said compression logic provides compressed video or graphics data to said IEEE 1394 physical layer device for transmission across the IEEE 1394 communication link to said remote interface.

13. The computer system of claim 12, further comprising:

a display coupled to said remote interface for displaying the video or graphics data as a respective video or graphics image.

14. The electronic device of claim 9, wherein said remote interface receives USE formatted data, removes USE encapsulation from the USB formatted data to provide a stripped packet of data, wherein the remote interface further comprises a link controller for receiving the stripped packet of data and encapsulating the stripped packet in 1394 format to produce IEEE 1394 reformatted data, wherein said remote interface communicates the IEEE 1394 reformatted data to a host computer via the IEEE 1394 port.

* * * * *